| United States Patent [19] | [11] | 4,391,838 |
|---|---|---|
| Pate | [45] | Jul. 5, 1983 |

[54] PROCESS FOR CONTINUOUS FLUIDIZATION OF SHORTENING

[75] Inventor: Daniel R. Pate, Strongsville, Ohio

[73] Assignee: SCM Corporation, New York, N.Y.

[21] Appl. No.: 320,860

[22] Filed: Nov. 13, 1981

[51] Int. Cl.$^3$ ............................................... A23D 5/02
[52] U.S. Cl. .................................... 426/606; 426/417
[58] Field of Search ................................ 426/606, 417

[56] References Cited

U.S. PATENT DOCUMENTS

| 2,815,285 | 12/1957 | Holman et al. | 426/606 |
|---|---|---|---|
| 2,815,286 | 12/1957 | Andre et al. | 426/606 |
| 2,999,022 | 9/1961 | Payne et al. | 426/606 X |
| 3,011,896 | 12/1961 | Eber et al. | 426/606 |
| 3,145,110 | 8/1964 | Abbott | 426/606 |
| 3,325,292 | 6/1967 | Endres et al. | 426/606 |
| 3,360,376 | 12/1967 | Dobson | 426/606 X |

*Primary Examiner*—Robert A. Yoncoskie
*Attorney, Agent, or Firm*—Richard H. Thomas

[57] ABSTRACT

There is provided a continuous process for fluidizing shortening compositions including a major amount of a normally liquid base oil and a minor amount of a normally solid lipid, the latter exhibiting polymorphic behavior. The composition is flowed through a length of tube and submitted to temperature oscillations alternating between a high temperature which is above the melting point of certain of the crystalline forms of the triglyceride but below that of the desired form (beta), and a low temperature which is below but close to the melting point of the lowest melting crystalline form (alpha).

22 Claims, 5 Drawing Figures

PROCESS FOR CONTINUOUS FLUIDIZATION OF SHORTENING

The present invention is in a process for producing continuously a fluidized fat composition especially those which are useful as a shortening in, for example, baked goods. More particularly, this invention is in a process for transforming to a large extent normally solid glyceride components of lipid compositions into a stable crystalline form whereby the composition at ordinary temperatures has good stability or shelf life and remains pourable and pumpable.

BACKGROUND OF THE INVENTION AND PRIOR ART

The demand for fluidized shortening is rapidly increasing because of convenience in storing, pumping and metering fluid shortening compositions. In large commercial bakery operations, plastic shortening is difficult to handle. It is nearly impossible to add plastic fats continuously to batters at controlled rates.

There is presently available on the market a number of major fluid shortenings. In these cases and depending upon the composition, fluidization is normally done in a batch tempering process which takes from 18 to 36 hours to obtain a stable fluid shortening.

It is a principal object of the present invention to provide a continuous fluidization process. Advantages are inherent in any type of continuous operation. Cost can usually be reduced, the control of the operation simplified and the quality of the final product enhanced.

Fluid shortenings containing suspended solids combine the highly functional characteristics of plastic shortenings with the ease of handling of liquid shortenings. Fluid shortenings are characterized by the presence of low levels of highly functional solids suspended in a normally liquid oil matrix. The liquid oil base in most commercial products is derived from soybean oil and is entirely liquid at 60° F. The type and amount of functional solids used including emulsifiers, viscosity stabilizers, conditioners, etc., depend upon the specific end use or application. Fluidized oils are used in dressing oils, cake shortenings, bread shortenings, and coffee whitener shortenings. The functional solids, particularly the stabilizers, are generally soybean base or of stable normally crystalline hard stocks having a melting point above about 100° F. The functional solid type and content, and the liquid oil matrices of a fluid shortening composition have an effect on the rate of crystal transformation or fluidization. In general, the fluidized shortenings of the prior art as well as those produced in accordance with this invention, have an overall Iodine Value in the range of from about 75 to about 125.

Generally, the normally liquid triglyceride base in fluid shortenings contains very few glycerides having melting points higher than 60° F., i.e., the base oil exhibits no ostensible solid phase particles at a temperature above about 60° F. The normally solid glycerides or lipids remain solid at temperatures as high as about 100° F. When the final suspension is cooled from 100° F. to 60° F., the amount of solids will not increase by more than about 20% of the solid content at 100° F. That is, the solid fat index (SFI) curves for fluid shortening are relatively flat in this temperature range. Compositions containing less than 1% to 2% solids are generally unstable; that is, the solids gradually settle out. Compositions containing greater than about 20% solids are generally too viscous and approach in consistency a plastic or stiffened product.

In commercially available fluid shortenings, the percent solids at room temperature (70° F.) range from about 4% to about 12% by weight. For a particular formulation having a given SFI profile and functionality, there is a specification for a centrifuge spin test which gives a measure of fluid shortening dispersion and viscosity of fluidity of the product. Stability is generally indicated at from 2% to 15% maximum free oil layer above a centrifuged sample according to the test procedure which will be described below. These two physical phenomena are generally inversely related. As the viscosity increases, separation decreases and vice versa. The storage life of fluid shortenings is specified as at least one month when shipped bulk and three to six months in a package, such as a can or a drum. During normal storage conditions or temperature cycling, the stability of a fluid shortening is manifest. During temperature lowering, solids may recrystallize in the form of interlacing crystals which impair fluidity of the shortening. The melting of solids during temperature elevation may cause separation of the liquid and solid phases. It is known that a stable fluid shortening must have a beta crystalline phase obtained from transformation of alpha or beta prime phases. (Reference may be had to the patents of Holman et al, U.S. Pat. No. 2,815,285 dated Dec. 3, 1957 and Andre et al U.S. Pat. No. 2,815,286 also dated Dec. 3, 1957). For uniformity and stability over a temperature range of from 60° to 100° F., at least 80%, and preferably 85% of the solids should be beta crystals. The beta stable crystals should be in a concentration such that the viscosity is low enough to enable easy pumping yet high enough to prolong suspension. (See the patents to Norris U.S. Pat. No. 3,914,452, dated Oct. 21, 1975, the patent to Reed et al, U.S. Pat. No. 3,857,985, the patents to Holman and Andre supra., and U.S. Pat. No. 3,145,110 dated Aug. 18, 1964).

The triglyceride molecules of fats, oils and shortenings exhibit four types of polymorphic forms which can be seen by X-ray diffraction spectra. (See U.S. Pat. No. 2,521,242 to Mitchell). In general, the alpha form crystallized from the liquid phase subsequentially transforms to beta prime, intermediate, and beta forms in series. (See Hoerr, C. W. "Morphology of Fats, Oils, and Shortenings", JAOCS., Volume 37., Oct. 1960). The alpha crystal has the lowest melting point and density, and is the least stable. The beta crystal has the highest melting point and density, and is the most stable. Once transformation to the more stable forms has occurred, lower polymorphs can only be obtained by completely melting the sample, crystallizing the alpha form, and repeating the transformation sequence. The readiness with which different forms crystallize from a liquid melt (alpha→beta prime→intermediate→beta) is in reverse order of their stability. Hence, the least stable form appears first in a super-cooled material. (A. E. Baily, Melting and Solidification of Fats, Interscience, Inc., N.Y., 1950).

Polymorphism of a lipid is basically dependent on composition of the lipid, processing, tempering and storage conditions, the effect of crystal promoters and inhibitors, (Thomas, "Shortening Formulation and Control", JAOCS, Volume 55., November 1978; Harnet, "Cake Shortenings", JAOCS, Volume 54., December 1977; MaCarthy, U.S. Pat. No. 3,796,806 dated Mar. 12, 1974). Polymorphism is most evident in commercial fats, such as, highly hydrogenated soybean oils. These fats consist predominately of a single glyceride such as, tristearin, (A. E. Baily, supra.). It is also evident in mixtures, e.g., fluid shortenings, of such fats with liquid oils of low melting point, although not normally evident in partially hydrogenated oils or fats having a wide variety of glycerides melting over a long temperature range.

Polymorphism is also exhibited in various emulsifiers commonly included in shortening compositions. Among these are the mono- diglycerides, e.g., glyceryl monooleate, glyceryl dioleate and mixtures thereof; the alkali metal or alkaline earth metal acyl lactylates, e.g., sodium stearoyl-2-lactylate; succinylated mono- and diglycerides. Such emulsifiers are well known in the art and reference may be had to Gawrilow U.S. Pat. No. 4,137,338 and the patents referred to therein for further details of such emulsifiers (note particularly columns 4 and 5 of U.S. Pat. No. 4,137,338). These lipids may be used in the shortening compositions hereof in replacement of part or all of the normally solid triglyceride component. The mono- and diglycerides are the easiest replacement lipids for use herein while the lactylates and succinylates should be used, if at all, in only partial replacement of the normally solid triglyceride and then not exceeding about 4% by weight of the shortening composition, and preferably less than 1% or 2%. The maximum tolerable amount will be found to vary with the nature of the base oil used. The ethoxylated mono- and diglycerides may be tolerated to a higher concentration, again depending on the base oil because of their apparent solubility in the base oil.

Generally, fats and oils that have Iodine Values above about 72 tend to crystallize in the alpha form, whereas those of lower Iodine Value can and do tend to transform to the beta prime form during solidification (Hoerr, supra.). It has been shown experimentally that the crystals of partially hydrogenated soybean oil, (70 I.V.) have approximate alpha, beta prime, and intermediate melting points of 68° F., 77° F., and 85° F., respectively. Soybean flakes, (stearine) have approximate melting points of 123° F. (alpha), 131° F. (beta prime), 139° F. (intermediate), and 145° F. (beta). The crystalline melt temperatures are dependent on the extent of the plastic state and upon the Iodine Value (I.V.). It has been found that an increased proportion of higher melting triglyceride in a fat or oil, evidently enhances the transformation to more stable forms, (Hoerr, supra.). A blend of liquid oil such as lightly or partially hydrogenated soybean oil, and normally solid triglycerides such as, soybean stearine, would have a composite crystal melting point spread of its two components.

Beta stable fluid shortenings contain large crystals (5 to 50 microns in longest dimension) that tend to prolong suspension (Thomas, supra). The smaller alpha and beta prime crystals are undesirable because they are needle-like in shape and tend to interlock and stiffen the final product. Alpha crystals are very soluble and tend to dissolve and recrystallize with temperature changes. Thus, the product will grow large crystals which tend to separate into liquid and solid phases at high temperature and solidify at low temperature. (See the Holman and Andre U.S. Pat. Nos. 2,815,285 and 2,815,286, supra.). An abundance of beta prime crystals tends to cause the product to become plastic rather than to remain fluent. Cottonseed oil and lard exemplify beta prime crystal-directing triglycerides; and their normally solid derivatives, including those from hydrogenation, have a preponderantly beta prime crystal-forming tendency. Conversely, the useful normally liquid base oils for the instant process, e.g., soy oil, are beta crystal-directing, i.e., they favor the formation of the beta crystalline form of a polymorphic lipid crystallizing therefrom. Furthermore, such lipid so crystallizing in the instant process should have a preponderantly beta crystal-forming tendency. For uniformity and stability over 60°–100° F., at least 80% of the solid fats in fluid shortenings should be converted to the beta form. In general, fluid shortening should not contain more than about 5% by volume of entrained air or other gases. Minimization of gas entrainment improves both the physical stability and viscosity characteristics over time. (See Norris U.S. Pat. No. 3,914,452, supra.). The lower melting polymorphs incorporate numerous relatively small air bubbles. The high melting polymorphs incorporate relatively few large air bubbles. Large air bubbles in a beta crystallized shortening can be removed by deaerating under vacuum (U.S. Pat. No. 3,857,985). If the aeration properties normally associated with beta prime small crystals, as in a plastic shortening, are required in the fluid shortening application, they can be achieved by the addition of an appropriate emulsifier. (Thomas, supra.).

When producing a stable fluid shortening from a liquid melt, the initial crystallization should take place rapidly so the alpha crystals will not grow large enough to interlock or form a viscous mass. (Holman and Andre, supra.). Mild agitation during processing reduces the growth of large crystals.

After crystals of a low melting form have been produced, crystals of the next higher melting form are obtained by heating the mixture to a temperature slightly above the melting point of the low melting solid form of the solidifying lipids present and allowing transformation or melting and resolidification to take place. (Bailey, supra., and Hoerr, supra.). Less desirable non-beta crystals can be transformed to beta stable crystals by heating the initially crystallized mixture to a temperature above the melting temperature of alpha and beta prime crystals but below the melting point of solid fats in the beta crystalline form. At this temperature, the mixture contains only beta crystals in liquid oil. Upon cooling, the crystal nuclei seed the crystallization to a beta phase. (Holman and Andre, supra.).

The glycerides with the shorter chain lengths have faster rates of polymorphic transformation. Like other transformations from metastable to stable state, fat polymorphic transformation can be relatively slow. At a temperature far below its melting point, an unstable form may exist indefinitely. The rate of transformation increases with an increase in temperature. However, at higher temperatures stable beta crystals dissolve to a large extent and cannot serve as seed crystals. Upon cooling such a mixture, the shortening may then form undesirable alpha or beta prime crystals or beta crystals which are too large or coarse in size. The time required for transformation may be reduced if the shortening is mildly agitated during fluidization and tempering. In general, higher temperatures are required for compositions containing larger amounts of solids.

Fluidized shortenings are relatively new to the market, and literature on processing is scarce. The best source of information appears to be from U.S. Patents. To the best of my knowledge, no strictly continuous process is being used or is described in the art for manufacture of fluid shortenings. All of the processes investigated on a production scale involve the use of quick chilling equipment, e.g., a Votator including "A" and "B" units in some scheme to effect the initial crystallized mass or crystal nuclei prior to or during fluidization. The current process technology can be divided into batch and mixed flow processes. It is evident that practiced fluidization processes evolved from modification of processes for production of plastic shortenings.

The current Votation-batch fluidization process for the production of fluid shortenings involves charging the ingredients to a feed tank and agitating them in a molten state at a temperature of from 120° to 140° F., depending upon the melting point of the batch solids. The molten oil is pumped through a Votation system consisting of "A" units and "B" units in series. The exit temperature from the "B" unit is 67°-102° F., depending on the shortening composition. The uniform dispersion exiting the "B" unit is charged to a 80,000 pound capacity Stehling tank where mild agitation, typically 15 rpm with an 11 foot diameter paddle, is begun when the tank is half full. Agitation is continuous for 16 to 36 hours depending on the stable fluid shortening being produced. The fluidization temperature is 80°-90° F. Cooling water is circulated through coils to remove heat of crystallization and transformation. The Votation rate is 15,000-20,000 pounds per hour, nominally 20,000 pounds per hour (pph) votators.

The dispersion charged to the fluidization tanks initially is solids in the alpha form suspended in the liquid oil base. During the fluidiz cycle, polymorphic transformation occurs, gradually producing a stable beta form solids fluid shortening. The agitation assists heat transfer and gently breaks crystal agglomerates with low shear.

A "dynamic" batch fluidization process involving batch recycling appears to be an improvement over the foregoing "static" batch fluidization system. Here, the process involves loading the liquid shortening mixture into a 60,000 pound tank with mild agitation. After filling, a portion, approximately 20,000 (pph), is rapidly chilled in a typical Votator system including "A" and "B" units in series to a temperature of 70° F. A suspension of crystals is formed which is returned continuously to the warm batch. The solids formed during rapid chilling immediately melt and incrementally lower the temperature of the mass in the tank. This continues until equilibrium is reached at which point the solid crystals returning to the batch are not completely melted but are transformed from the lower polymorphic forms to the more stable beta crystalline form. These crystals act as a seed for further crystallization until the total mass of the batch is converted into a stable dispersion or suspension. The converted mass is deaerated to prevent oxidative deterioration during processing.

Starting with initial batch temperature of 160° F., the mixture drops in temperature exponentially until a temperature of 76° F. is reached in about 13 hours. The substantially converted mixture is then held at this low temperature for 1-2 hours to complete the conversion to beta form prior to packaging.

A more highly temperature controlled process involves "double cooling" with a controlled heat cycle. This process is described in the Holman and Andre patents, supra. Here, the ingredients are charged and agitated in a molten state and pumped through a conventional Votation system to obtain the initial crystallized mass. After initial crystallizing, the mixture is heated to a tempering or fluidizing temperature sufficiently high to dissolve alpha or beta prime form crystals or to transform these less desirable crystals to a beta form. The fluidizing tank is filled and held at a proper temperature until a desired transformation has occurred. This takes from 0.5 to 3 hours. The mixture contains basically only beta form crystals and liquid and on subsequent cooling these beta form crystals serve as crystal nuclei for seeding the crystallization.

When a high tempering temperature has been used, or when the solid content of the product is high, it may be desirable to chill the product rapidly back down to 50°-60° F. This crystallizes substantially all of the solid glycerides which may have melted during the tempering or fluidizing process. That is, super cooling and solidification under working is better than static precipitation of solids in storage which may cause stiffening of the product. The type of heating and cooling exchangers used after initial votation is not identified in the literature.

A summary of the processes investigated is shown in Table 1 below. This is an arbitrary listing. All of the information can not be put on a common basis because of the myriad fluid shortening products for which the processes were designed or processing data applies. The literature suggests that there is a trade-off between the equipment processing and "tempering" in storage or package. That is, processing ensures adequate conversion such that subsequent storage can maintain complete residual conversion to a stable suspension. Processes that have lower claimed fluidization times may require more control tempering or storage conditions to complete the conversion.

It is a primary object of the present invention to provide a process that significantly reduces fluidization time with high conversion to minimize further changes in storage or packaging, or control storage requirements. Truly continuous fluidization in accordance with the present invention is included in Table 1 for comparison.

TABLE I

FLUID SHORTENING PROCESSING METHODS FOR FULL SCALE PRODUCTION

| Fluidization Process (Reference) | Fluidizing Time | % Beta Conversion | Tankage/ Holdup |
| --- | --- | --- | --- |
| A. Batch (Norris 3,914,452) | High (16-36 hrs.) | 100 | High |
| B. Batch w/recycle (Reid et al U.S. Pat. No. 3,857,985) | Med. (10-15 hrs.) | 85(?) | High |
| C. Batch w/double cooling and/or seeding (Holman, Andre, supra. and McCarthy U.S. Pat. No. (3,796,806) | Low (0.5-3 hrs.) | 60(?) | Medium |
| D. Continuous | Fast (minutes) | 90+ | Low |

The fluidized shortening compositions produced in accordance with this invention have essentially the same properties and are used in the same known manners as the fluidized shortening compositions of the prior art.

BRIEF STATEMENT OF THE INVENTION

Briefly stated, the present invention is in a continuous fluidization process for a lipid feed composition including (a) a major amount of normally liquid beta crystal tending base oil, (b) a minor amount generally less than about 20%, preferably less than 15% and more preferably from about 4% to about 12% by weight of a normally solid lipid, e.g., a normally solid triglyceride, and said composition preferably having an overall Iodine Value (I.V.) in the range from about 75 to 125. The normally solid lipid is capable of exhibiting polymorphic crystalline behavior, e.g., casting normally solid lipid crystals in a plurality of crystalline forms including alpha, beta prime, and beta. Optionally a third component (c) may be present which is almost any food ingredient, e.g., colorant, flavor, emulsifier, etc., in an amount insufficient to adversely affect the fluidization process, e.g., by causing a difficultly pumpable mixture exiting the Votator stage. The lipid component (b) may be a mixture of lipids, e.g., a mixture of mono- diglyceride (oleate) and vegetable oil normally solid triglyceride, e.g., stearine. The process comprises passing under substantially anaerobic conditions, a body of the composition and submitting it during flow through a heat exchange zone alternately to a sequence of high temperature and low temperature oscillations. Conveniently, the process is carried out in a continuous tube. The amplitude of temperature oscillation is generally in the range from about 8° F. to about 25° F.. Preferably, the amplitude of temperature oscillation increases on successive cycles. The high temperature is below the melting point of the beta form and above the melting point of the alpha and beta prime forms, and the low temperature is below the melting point of the alpha form of the lipoidal composition but sufficiently high to maintain the fluency of the materials in process, for example, no more than about 5° F. below the latter melting point. In any event, the material at or below the low temperature should be pumpable. The resulting product is such that a fluidizing portion, e.g., at least about 80% of the suspended normally solid lipid crystals, are in the beta form and the product is stable at 70° F. and the pourable composition is at ordinary temperatures.

In a more specific embodiment of the invention, a melt or solution of shortening composition is votated, or shock cooled, typically in a scraped wall heat exchanger, to an exit temperature in the range from about 65° F. to about 100° F. to nucleate the mass prior to entering a first zone of high temperature.

The process of this invention is applicable to both edible and nonedible oils. For convenience, the invention will be discussed in reference to edible oils. The term "normally solid" and "normally liquid" as used herein refer to room temperature, i.e., about 68° F.±5°.

BRIEF DESCRIPTION OF THE DRAWINGS

The present invention may be better understood by having reference to the annexed drawings wherein.

DETAILED DESCRIPTION OF THE APPARATUS AND SPECIFIC EXAMPLES

Figure 1:
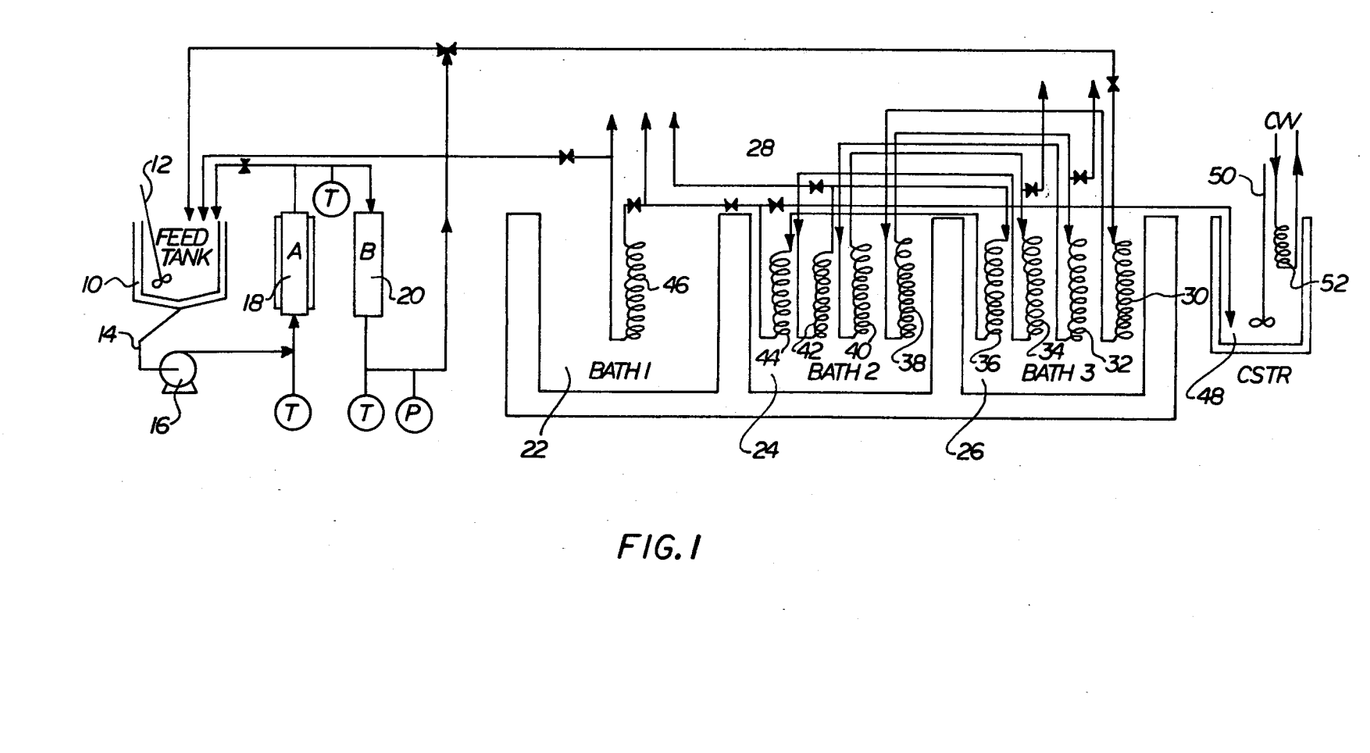
FIG. 1 is a diagrammatic and schematic illustration of an apparatus suitable for carrying out the continuous fluidization process of the present invention.

FIG. 1 is a diagrammatic and schematic layout of a bench scale apparatus useful for the continuous production of fluidized shortening. This apparatus consists of a heated feed tank 10 equipped with an agitator 12. An outlet 14 from tank 10 to the inlet side of pump 16 enables feeding of the fully liquefied unfluidized oil to a votator "A" unit 18 and from the latter into a votator B unit 20. The votators 18 and 20 are of standard well known construction and operation, and subject the feed blend to shock cooling from a fluent state to a fluent slurry, or magma of lipoidal solids in the base oil prior to undergoing temperature oscillations. The piping used in this apparatus is $\frac{3}{8}''$ diam. 316 stainless steel tubing. A Forma Scientific Triple Temperature Bath (commercially available) is used to provide accurate temperature control of the water baths 22, 24, and 26. Sample valves, e.g., valve 28, are provided at the places indicated in the drawing to allow processing with one to four complete temperature cycles and intermediate sampling. For purposes of this disclosure and the appended claims, the term "cycle" will be understood as movement at the temperature from a low extreme of temperature through a high extreme of temperature and back to a low extreme.

Nine coils 30, 32, 34, 36, 38, 40, 42, 44, and 46 are provided. Each is approximately 10 feet long and connected in series in alternating hot (26) and cold (24, 22) water baths, four coils in each of baths 3(26) and 2(24), and one in bath 1, (22). The number of temperature cycles or oscillations ranges, in general, from 2 to 5 or more at an amplitude of from about 12° F. to about 25° F. Suitable valving on the coils enables control of the number of cycles. Preferably, the temperature difference on successive cycles increases within the range of amplitudes by from 0.5° F. to 5° F. This is contrary to the teachings of the prior art.

There is optionally provided a stainless steel continuously stirred tank reactor (CSTR) 48 having a capacity of about one gallon provided with a variable speed agitator 50 and a cold water (CW) cooling coil 52. The option of replacing the CSTR 48 with another cooling coil 46 in Bath 1 (22) is provided. The apparatus provides a total process length of approximately 200 feet.

In operation, the flowrate for the oils tested ranged from about 30 to a maximum of 50 pounds per hour (pph) with the feed pump or partial recycling to the tank 10 after the votator A 18. The exit temperature of the B unit 20 was set at specified temperatures for given oils.

The water baths were held to ±0.5° F. of the selected hot and cold temperatures. Although probes and internal gauges were tried to determine the temperature of process fluids, these were found to be unsuccessful because of the small tubing diameter. Temperatures were, however, roughly monitored by thermometers placed in the fluid stream as it was collected after a cooling cycle. It was assumed that if the temperature was within 1° F. of the desired bath temperature, the system was at equilibrium. The fluid leaving the heating coil was assumed to be within 1° F. of the hot bath temperature.

The shortening compositions that were used for the following experiments were formulated in 50 pound lots and were recycled and remelted if not collected as samples. It was later found that shortenings which contained lactylated emulsifiers in amounts of from 4% to 8% by weight (fluid shortening C and B) (FIG. 3) could not be remelted or reused because of thickening and abnormal crystallization behavior in the particular apparatus (FIG. 1). They could, however, be fluidized in a batch process. Lower amounts of the emulsifier, e.g., 1% to 2% could be tolerated, and larger scale apparatus would improve results with shortening compositions containing these emulsifiers.

System back pressures were normally between 40 and 60 psi when 4 complete temperature cycles were used. Back pressures in excess of 80 psi were experienced when the solid contents became too high and/or viscosity became too high, low cold cycle temperatures, solidification in process lines, etc. High back pressures usually lead to reduced flow rates and eventually line freeze ups. Intermediate sampling caused system disruptions and made it difficult to monitor process temperatures, to reduce the number of experimental runs required, and to maintain votation conditions. At least 30 minutes were required to reach steady state after a change in cycle temperature conditions and 60 minutes were required after a change in flow rate or votation conditions. The processing of the present invention is desirably carried out under anaerobic conditions.

Samples were collected in 8 ounce jars or 5 gallon pails and stored at temperatures of 70° F., 85° F., and 100° F., or uncontrolled temperature environments anywhere from one day to five weeks. Not all samples were stored or subsequently analyzed. Thus, if the product was not fluid or stiffened in a short time, it was not subsequently analyzed.

In general, all samples were unstable after storage at 100° F. and increased in viscosity (although they remained fairly stable) at 70° F. The 85° F. and uncontrolled environments proved to be the most useful in differentiating samples. No systematic or extensive storage studies were actually conducted; the main objective being to obtain fluid and stable shortening directly from the unit in terms of viscosity, percent separation and beta crystal formation. The only storage specification for acceptability is that no visible separation should occur, or less than 1.0 percent by the spin test after one month of storage of a fluid sample. "Fluid" generally means having a viscosity of less than 2800 cps.

Viscosity measurements were made with a Brookfield model LVT viscometer using a number 3 spindle at 60 rpm. The shortening temperature at the time of determination was approximately 80° F. or at a specified storage temperature.

Melting points herein may be determined by either the well known Wiley Melting Point technique or the more accurate Mettler Dropping Point Test described as follows:

Apparatus necessary for performing the Mettler Dropping Point determination includes the Mettler Instrument Corporation electronic control FP5 modified to heat at a fairly slow rate and Mettler furnace FP53 with accessories, and Wiley Melting Point plates. Accessories are at least one sample cup, which fits into a cartridge, which assembly in turn fits into a sleeve. The sample cups have a bottom opening of 2.8 mm diameter. They also fit into the holes of the Wiley plate.

One packs the cup with the sample after the cup has been precooled and still remains in the Wiley plate holes, said plate being in a tray of dry ice (solid carbon dioxide). It is not necessary to level off the top of the cup. The sample then is chilled for at least ten minutes.

A starting temperature 5° C. below the expected melting point is set on the furnace control, along with a programmed heating rate of 1° C. per minute. When furnace temperature agrees with the indicator on the control unit, the chilled dropping point cup is removed from the dry ice tray by using the upper portion of the cartridge and assembled with such cartridge, then the drop-collecting sleeve is attached. This assembly is inserted vertically into the furnace and rotated until the cartridge locks in position. At this state the cup is equilibrated with the lowest temperature of the furnace by waiting two minutes, then the automatic heating rate is activated. The Dropping Point will be recorded by the apparatus, usually in °C. The Dropping Point very closely approximates the Wiley Melting Point, and it is more reproducible; it eliminates an operator's subjectivity which is inherent in measurement of Wiley Melting Point.

The Solids Fat Index is a measure by dilatometry of the solid phase coexisting with the liquid phase of a fat at a given temperature, and it can be measured by the AOCS Official Method Cd 10-57.

The spin test was run and percent separation determined as follows:

A 50 ml sample of shortening was placed in a graduated centrifuge tube and spun at 1500 rpm for 15 minutes. The shortening temperature at the time of the spin was either the process discharge temperature or at a specified storage temperature. Results were recorded as percent clear oil by volume.

The percent separation is usually differentiated from the spin test as the percent by volume of clear oil visible without centrifuging, that is due simply to gravity settling. The crystal structure was determined by X-ray diffraction. Samples were prepared by forcing a small amount of a fluid shortening through a filter with a syringe to remove free oil. The solid cake was packed into diffraction holders and X-ray patterns were recorded on a strip chart recorder. Polymorphic forms are identified by the following peaks:

| | |
|---|---|
| Alpha | 1 peak at 21.5° |
| Beta prime | 2 peaks at 21.3° and 23.7° |
| Beta | 3 peaks at 19.4°, 23° and 24° |

This technique was used to determine the predominate form. It is not a test used in production since X-ray analysis is not normally done in a production facility. The actual percentage of each is strictly subjective. There are no distinctive peaks if appreciable liquid is left in the crystal cake during preparation. This is not a test of stability; beta crystal containing samples may separate or may be thick, and beta prime containing samples may be technically fluid and inseparable. This method was generally unsatisfactory for shortenings C (U.S. Pat. No. 3,011,896) and B (U.S. Pat. No. 4,234,606) (FIG. 3), both of which are lactylated shortenings.

The following tables show the conditions of continuous fluidization and the results obtained according to the preceeding tests. The run numbers correspond to the letter indications for the properties shown in FIG. 3.

Table 1 shows the conditions and results for continuous fluidization in the apparatus shown in FIG. 1 for the edible shortening F, a commercial shortening identified as B-40. The shortening F has the following specifications. It is a partially hydrogenated soybean oil with mono- and diglycerides. (See U.S. Pat. No. 4,199,603, Column 4.). The I.V. maximum is 96, and the maximum S.F.I. at 50° is 9. The oil comprises 90% hydrogenated soybean oil; 6% stearine, and 4% of a mono- and diglyceride emulsifier containing citric acid (Dur-Em-117). This material is generally chilled from a melt temperature of about 150° F., without nitrogen through A and B units with the B unit exit temperature being at 99°–102° F. The product is tempered with continuous agitation in a CSTR for a minimum of 18 hours. The specifications to be achieved are as follows:

| | |
|---|---|
| Oil Separation % | 15.0 max. |
| Viscosity (cps) | 1200 max. |

The results and comparable properties under various conditions of continuous fluidization are given in Table I below.

protect flavor. This material contains 88–89%, 95 I.V. hydrogenated soybean oil, 12 maximum SFI at 50° F. It contains also 2–3% soybean stearine; 9.0–10.0 Dur-Em 204, (a mono- and diglyceride emulsifier) and 0.18–0.20 Tenox 20 (a TBHQ antioxidant). This material is chilled through A and B votator units with the B unit exit temperature being at 88°–90° F. This product is identified in FIG. 3 as A, and is described in U.S. Pat. No. 4,239,786.

This material was submitted to the continuous fluidization procedure of the present invention and the results are set forth in Table II below.

TABLE II

CONTINUOUS FLUIDIZATION OF A

| | Votation | | | Fluidization | | | | | | Initial Product* | | |
|---|---|---|---|---|---|---|---|---|---|---|---|---|
| Run No. | A-Unit Feed Temp. (°F.) | A-Unit Exit Temp. (°F.) | B-Unit Exit Temp. (°F.) | No. of Cycles | Use of CSTR | Flowrate (pph) | Total Residence Time (min.) | High Cycle Temp. (°F.) | Low Cycle Temp. (°F.) | CSTR Temp. (°F.) | Oil Sep. (%) | Viscosity (cps) | Comments |
| A-1 | 146 | 84 | 89 | 4 | — | 35 | 8.9 | 95 | 88 | — | 0.0 | 1573 | Stiffened (B') |
| A-2 | 147 | 84 | 89 | 4 | — | 35 | 8.9 | 104 | 88 | — | 0.0 | 868 | Fluid (B & B') |
| A-3 | 148 | 84 | 89 | 4 | — | 35 | 8.9 | 95 | 84 | — | 0.0 | — | Stiffened (B') |
| A-4 | 148 | 84 | 89 | 4 | X | 35 | 21.7 | 95 | 84 | 82 | 5.0 | 1700 | Thick (B & B') |
| A-5 | 147 | 84 | 89 | 4 | — | 35 | 8.9 | 104 | 86 | — | 0.0 | 1395 | Fluid (B & B') |
| A-6 | 147 | 84 | 89 | 4 | X | 30 | 25.3 | 104 | 86 | 88 | 1.0 | 1820 | Fluid (B & B') |
| Spec. | — | — | (88–90) | | | | | | | | 5.0 max. | 1000 max. | Fluid (B) |

Another oil composition submitted to the continuous fluidization procedure of the present invention is a partially hydrogenated soybean oil composition identified by the trademark "Dress-All" (See U.S. Pat. No. 4,199,603, Column 4.). This material is an edible partially hydrogenated soybean oil with artificial flavor, tertiarybutylhydroquinone to help protect flavor, and artificial coloring. It is composed of 97% partially hydrogenated soybean oil having a solid fat index at 50° F.

TABLE I

CONTINUOUS FLUIDIZATION OF F

| | Votation | | | Fluidization | | | | | | Initial Product* | | |
|---|---|---|---|---|---|---|---|---|---|---|---|---|
| Run No. | A-Unit Feed Temp. (°F.) | A-Unit Exit Temp. (°F.) | B-Unit Exit Temp. (°F.) | No. of Cycles | Use of CSTR | Flowrate (pph) | Total Residence Time (min.) | High Cycle Temp. (°F.) | Low Cycle Temp. (°F.) | CSTR Temp. (°F.) | Oil Sep. (%) | Viscosity (cps) | Comments |
| F-1 | 150 | 94 | 100 | 3 | — | 44 | 5.3 | 113 | 100 | — | 0.0 | — | Stiffened |
| F-2 | 150 | 91 | 97 | 3 | — | 44 | 5.3 | 111 | 98 | — | — | — | Stiffened |
| F-3 | 150 | 92 | 98 | 3 | — | 40 | 5.8 | 111 | 102 | — | 0.0 | — | Solid |
| F-4 | 150 | 96 | 102 | 3 | — | 40 | 5.8 | 113 | 100 | — | 0.0 | — | Solid |
| F-5 | 150 | 91 | 97 | 3 | — | 40 | 5.8 | 113 | 97 | — | 0.0 | — | Solid |
| F-6 | 145 | 90 | 96 | 3 | — | 50 | 4.7 | 113 | 98 | — | 0.0 | — | Solid |
| F-7 | 145 | 89 | 95 | 3 | — | 44 | 5.3 | 113 | 98 | — | 0.0 | — | Solid |
| F-8 | 145 | 94 | 100 | 3 | — | 35 | 6.7 | 113 | 100 | — | 20.0 | — | Solid |
| F-9 | 150 | 95 | 101 | 3 | — | 30 | 7.8 | 113 | 101 | — | 0.0 | — | Solid |
| F-10 | 149 | 96 | 101 | 4 | — | 33 | 9.5 | 117 | 103 | — | 0.0 | — | Stiffened |
| F-11 | 150 | 96 | 101 | 4 | X | 33 | 23.0 | 113 | 100 | 91 | 0.0 | 1035 | Fluid (Beta) |
| F-12 | 150 | 97 | 102 | 4 | X | 33 | 23.0 | 113 | 99 | 91 | 0.0 | 1070 | Fluid (Beta) |
| F-13 | 150 | 100 | 101 | 4 | — | 33 | 9.5 | 113 | 90 | — | 0.0 | — | Stiffened |
| F-14 | 150 | 100 | 105 | 4 | X | 33 | 23.0 | 108 | 83 | 73 | 0.0 | — | Stiffened |
| F-15 | 148 | 96 | 101 | 4 | X | 33 | 23.0 | 108 | 83 | 72 | 0.0 | — | Stiffened |
| F-16 | 149 | 95 | 100 | 4 | X | 33 | 23.0 | 106 | 88 | 82 | 0.0 | 2560 | Fluid (B & B') |
| F-17 | 150 | 95 | 100 | 4 | X | 30 | 25.3 | 108 | 90 | 88 | 0.0 | 2172 | Fluid (B & B') |
| Spec. | — | — | (99–102) | | | | | | | | 15.0 max. | 1200 max. | Fluid (B) |

*Quality tests (viscosity, X-ray diffraction) were not performed unless sample remained fluid for one hour.

The next material that was tried was an edible fluid shortening for spray dried coffee whiteners commercially available under the trademark "Delta White". This material is a partially hydrogenated soybean oil with mono- and diglycerides and including tertiarybutylhydroquinone (TBHQ) and citric acid to help of from 3 to 6. It contains 3% Durkee 17, 0.15% butter flavor, and 0.002% beta carotene colorant, and 180–200 parts per million of tertiarybutylhydroquinone. The votator conditions include a feed temperature of 120°–125° F.; B exit temperature of 80°–82° F.; and votation is carried out through A and B units.

Figure 3:
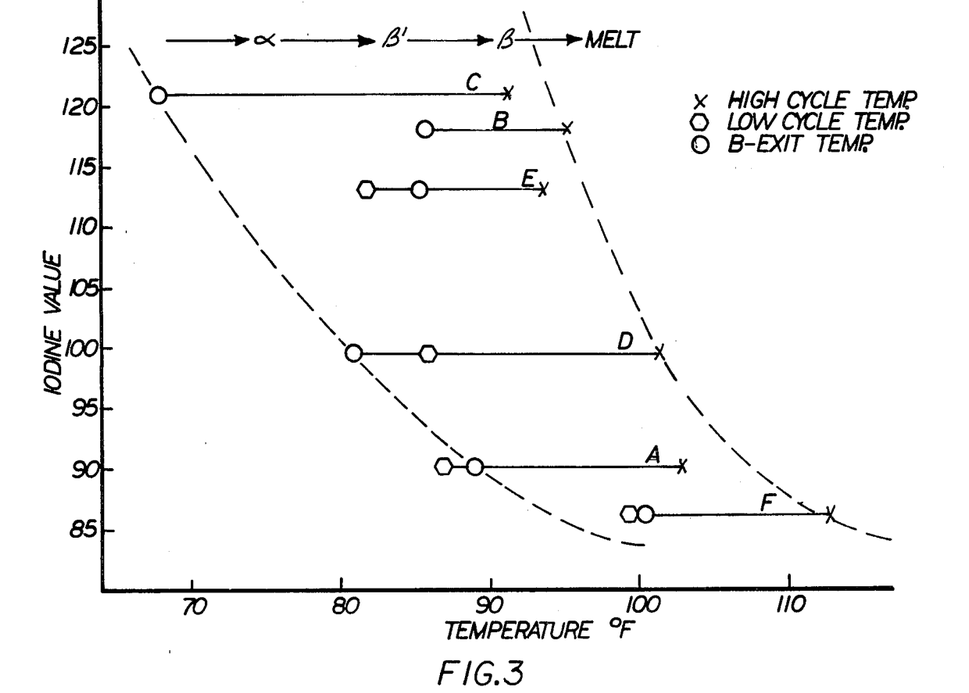
FIG. 3 is a graph wherein Iodine Value is plotted against temperature for a series of commercially available edible shortenings.
Figure 4:
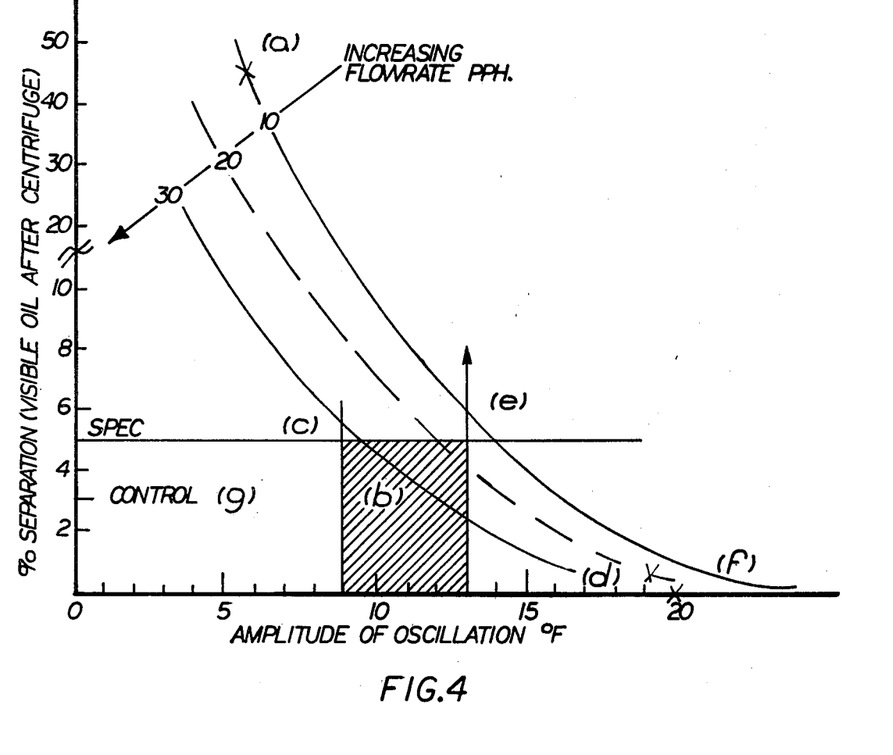
FIG. 4 is a graph showing the percent oil separation plotted against the amplitude of temperature oscillation for oil E of FIG. 3.

This material is identified as D on FIG. 3, and when submitted to the process of the present invention was treated under the following conditions and gave the following results as set forth in Table 3.

specifications for oil E is 12° F. As the flow rate increases, the percent oil separation decreases. 30 pounds per hour at the optimum amplitude of oscillation of 12° F. gave a fluid shortening which was within specifications. The low cycle temperature is 94° F. minus 12° F., or 82° F. Data points a, b, c, d, e, and f are for shorten-

TABLE III

CONTINUOUS FLUIDIZATION OF D

| | Votation | | | Fluidization | | | After 2 Weeks Storage | | |
|---|---|---|---|---|---|---|---|---|---|
| Run No. | B-Unit Exit Temp. (°F.) | No. of Cycles | Flowrate (pph) | Total Residence Time (min.) | High Cycle Temp. (°F.) | Low Cycle Temp. (°F.) | Oil Sep. (%) | Viscosity (cps) | Comments |
| D-1A | 80 | 4+ | 15.3 | 22.9 | 90 | 75 | 0.0 | 2700 | Fluid |
| D-1B | 80 | 4 | 14.0 | 22.3 | 90 | 75 | 1.0 | 1000 | Fluid |
| D-1C | 80 | 3 | 14.1 | 16.5 | 90 | 75 | 0.0 | 3650 | Fluid |
| D-1D | 80 | 2 | 15.1 | 10.3 | 90 | 75 | 0.0 | 4000 | Fluid |
| D-1E | 80 | 1 | 16.6 | 4.7 | 90 | 75 | 0.0 | 4150 | Fluid |
| D-2A | 80 | 4+ | 12.6 | 27.8 | 90 | 80 | 1.0 | 750 | Fluid |
| D-2B | 80 | 4 | 13.0 | 24.0 | 90 | 80 | 0.0 | 1050 | Fluid |
| D-2C | 80 | 3 | 14.0 | 16.6 | 90 | 80 | 0.0 | 4700 | Fluid |
| D-2D | 80 | 2 | 15.4 | 10.1 | 90 | 80 | 0.0 | 5500 | Fluid |
| D-2E | 80 | 1 | 17.2 | 4.5 | 90 | 80 | 0.0 | 7300 | Fluid |
| D-3A | 80 | 4 | 12.7 | 24.6 | 87 | 77 | 1.0 | 1700 | Fluid |
| D-3B | 80 | 3 | 13.6 | 17.1 | 87 | 77 | 1.0 | 2900 | Fluid |
| D-4A | 80 | 4 | 19.8 | 15.8 | 87 | 77 | 1.0 | 1250 | Fluid |
| D-4B | 80 | 3 | 21.5 | 10.8 | 87 | 77 | 1.0 | 3050 | Fluid |
| D-5A | 80 | 4 | 12.4 | 25.2 | 93 | 83 | 0.0 | 550 | Fluid |
| D-5B | 80 | 3 | 13.0 | 17.9 | 93 | 83 | 0.0 | 3200 | Fluid |
| D-6A | 80 | 4 | 12.9 | 24.2 | 100 | 86 | 1.0 | 450 | Fluid |
| D-6B | 80 | 3 | 13.9 | 16.8 | 100 | 86 | 1.0 | 600 | Fluid |
| D-7A | 80 | 4 | 18.1 | 17.2 | 103 | 86 | 1.0 | 500 | Fluid |
| D-7B | 80 | 3 | 19.0 | 12.3 | 103 | 86 | 1.0 | 550 | Fluid |
| Spec. | (80–82) | | | | | | 2 max. | 1200 max. | Fluid (Beta) |

4+ = extra cooling coil (replaced CSTR).

Figure 2:
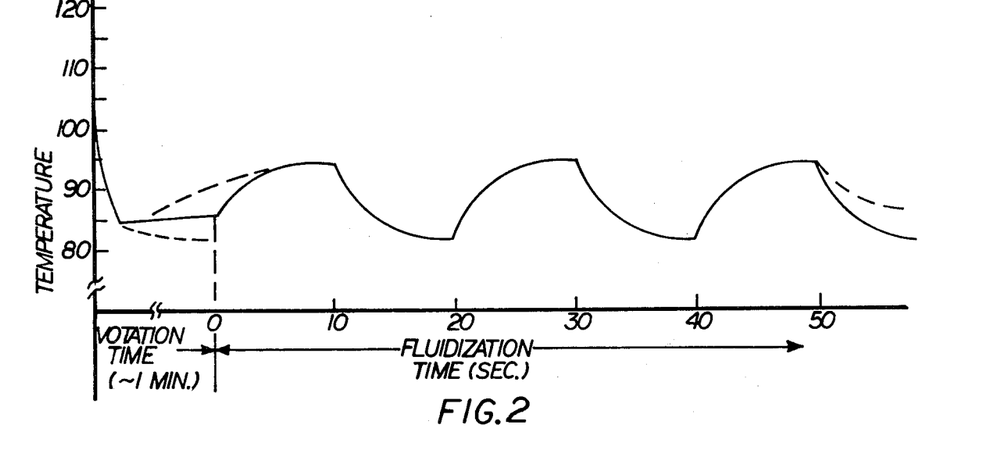
FIG. 2 shows a temperature profile plotted against time along which a typical fluidization procedure may proceed.

In FIG. 2, there is shown a plot of a temperature versus the fluidization time in seconds. For the shortening E shown in FIG. 3, an in-specification fluid shortening was obtained with three oscillations or cycles of temperature after typical votation through A and B units. The best conditions were found to be a fluidization rate of 30 pounds per hour, a high cycle temperature of 94° F., and a low cycle temperature 82° F. The base temperature or exit temperature from the B unit was approximately 89° F. With the E type fluid shortening, the residence time was approximately 1 to 10 minutes. Shortening E was particularly easy to fluidize.

FIG. 4 shows a comparison of the percent of visible oil separated after centrifuging plotted against the amplitude of oscillation of the temperature. The oil used to develop this table was the oil represented by the letter E on FIG. 3, and is described in U.S. Pat. Nos. 3,914,452 and 3,943,259 to Norris. This is a partially hydrogenated soybean oil with mono- and diglyceride present together with ethoxylated mono and diglycerides and tertiarybutylhydroquinone to protect flavor. FIG. 4 shows that as the amplitude of temperature oscillation increases, the percentage of oil separation decreases. The optimum amplitude of oscillation for meeting the ing E (FIG. 3). Control g is a batch comparison.

Table 4 summarizes the results of the foregoing examples.

TABLE IV

BENCH-SCALE FLUIDIZATION DATA SUMMARY
CONTINUOUS APPARATUS

| Fluid Shortening | Votation B-Unit Exit Temp. | No. of Cycles | Residence Time (min.) | Low Cycle Temp. | High Cycle Temp. | Relative Ease of Fluidization |
|---|---|---|---|---|---|---|
| E | 85–86 | 3 or 4 | 1.0–9.5 | 82 | 94 | Easy |
| F | 99–102 | 4 + CSTR | 23 | 99–100 | 113 | Moderate |
| A | 88–90 | 4 | 8.9 | 86–88 | 104 | Moderate |
| D | 80–82 | 3 or 4 | 12.3–24.2 | 86 | 100–103 | Easy |

In a similar manner, shortening compositions other than those described above may be fluidized by the continuous process hereof. These include, for example, normally liquid animal and vegetable oils, such as partially hydrogenated oils, for example, partially hydrogenated peanut oil, sperm oil, linseed oil, corn oil, safflower, sesame, palm kernel oil, coconut oil, olive oil, fish oil, and the oleine fractions thereof obtained by winterizing, graining or solvent fractionation with a solvent such as acetone, etc. alone or in admixture with each other or in admixture with liquid mono- and diglycerides such as monolinolein, monolinolenin, diolein, dilinolein, or the like. The normally liquid base oils are generally favorable to the formation of beta form crystals. Oleine fractions of the beta prime tending vegetable oils, e.g., cottonseed, palm, rapeseed, etc., may be used as beta tending normally liquid base oils. The complete shortening compositions have a solid-fat-index (SFI) generally below about 20 at 50° F. and preferably below 10 at 50° F.

As the normally solid lipid moiety, the stearine fractions of any of the foregoing oils obtained by winterizing, graining or solvent fractionation, tristearin, tripalmitin, palmito-distearin, hydrogenated triglyceride animal or vegetable fats or oils, such as, sunflower seed oil, lard, tallow, or completely hydrogenated mixed oils, e.g., mixed soybean and cottonseed oils, etc., mixed partially hydrogenated soybean/cottonseed oils (50:50), or other normally solid triglycerides may be used. The normally liquid partially hydrogenated oils or mixed oils have an I.V. which is generally below 150 and preferably in the range of from 80 to 130. Normally solid triglycerides, which are the preferred additive moiety, have an I.V. which is generally below 15 and preferably from 1 to 10. The I.V. of the blend is preferably in the range of from 75 to 125. For purposes of forming edible compositions, the raw oils are alkali refined, bleached and optionally, albeit desirably, partially hydrogenated prior to use herein. Reference may be had to the patent to Mitchell U.S. Pat. No. 2,521,242 (which is incorporated herein by reference) for suitable examples of normally liquid oils and normally solid glycerides which may be blended and fluidized in accordance with the teachings of the present invention. Various additives, such as, emulsifiers, flavorants, colorants, and antioxidants may be included in the shortening compositions in amounts generally less than 10% by weight, and effective for the purpose indicated by the name.

As result of the foregoing runs, it was determined that scraped surface heat exchangers provide the most useful larger scale apparatus because the process contemplates crystallization and transport of a slurry. Scraped surface exchangers allow continuous crystallization with no crystal build up on the wall and continual replacement of the static liquid film at the wall to enhance heat transfer to the fluid. For best results, the exchanger system has separate temperature control over each exchanger and a rotor with an independently variable speed drive. This provides mechanical working to the fluid as it undergoes the temperature oscillations. These systems satisfy the requirement for "plug flow", that is, all fluid segments having equal residence times, hence uniformity of crystal transformation, and necessary residence time flexibility. Separate temperature control and independent variable speed drives are desirable embodiments albeit quite costly.

It has been found that a standard plant votation process may be used to feed the continuous fluidization process of the present invention. Approximately 30 minutes residence time is needed for crystal transformation. The process fluid desirably goes through three temperature oscillations. Each cycle temperature from low extreme through high extreme and back to low extreme, such as illustrated in FIG. 2, should be independently controlled to within about 1° F. The process should, for best results approximate "plug flow". The minimum cycle temperature of 65° F. and a high cycle temperature of 117° F. must be attainable. Maximum heat load for each cycle is based on a maximum temperature amplitude of 25° F. and a process flow rate of 350 pounds per hour (pph) (pilot plant scale).

Figure 5:
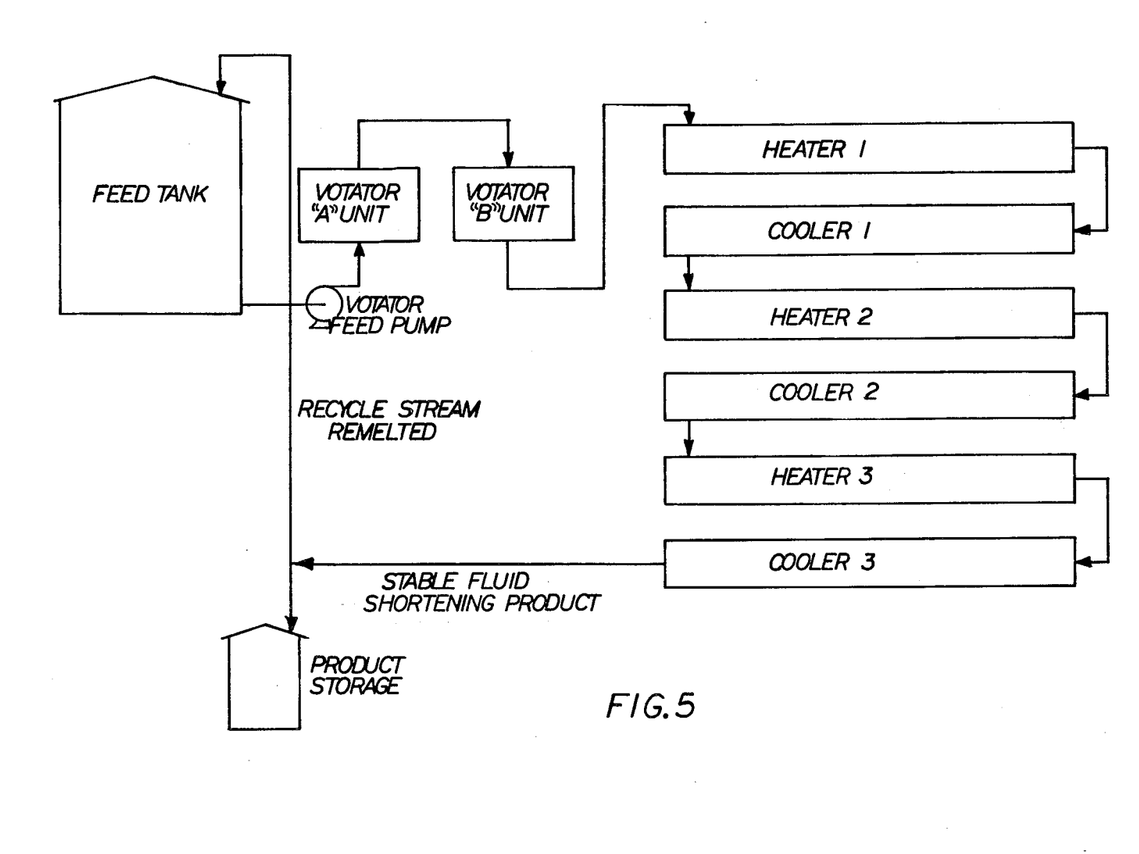
FIG. 5 is a schematic and diagrammatic illustration of a small scale apparatus of the type used in carrying out fluidization tests reported herein.

As shown in FIG. 5, six heat exchangers connected in series are used to achieve three hot-cold temperature oscillations. More or less pairs (hot and cold) of heat exchangers may be used. Preferably from 2 to 5 or more temperature cycles are provided. Higher than 5 cycles while yielding good product is simply excessive, unnecessary and expensive. Feed to these exchangers is from the exit of the votator B unit of the plant votation process. This process can deliver from 70 to 350 pounds per hour. Temperature control and pumping power are limitations which must be considered. Successful continuous fluidization scale runs have been made with fluid shortening E, F, A and D (FIG. 3) and with minimum residence times of 1.0, 23.0, 8.9, and 12.3 minutes respectfully (Table 4). It has been found that additional residence time will not be detrimental to product quality. The more difficultly fluidized products B and C (FIG. 3) require additional residence time. In general, the equipment should be capable of providing residence times of from 20 to 80 minutes at flow rates of from 70 to 350 pounds per hour. Plug flow characteristics are approached by the use of heat exchangers with small cross sectional areas for flow, and scraper blades that give little back mixing. Plug flow implies substantially no backmixing. A heat exchanger which provides 9 square feet of exchange area has been found to be more than adequate for the present process.

The fluidized shortenings hereof may be used as a replacement for part or all of the shortening ingredient in various bakery compositions such as those disclosed in the patent to Eber et al, U.S. Pat. No. 3,011,896, which patent is also incorporated herein by reference thereto for a teaching of a manner of using the products of this invention. This reference also discloses the product C on FIG. 3. A typical example of a cake formation is as follows: Percentages here given are on the total mixture rather than on the flour weight.)

| Ingredient | Percent |
| --- | --- |
| Granulated sugar | 43.9 |
| Cake flour | 39.0 |
| Salt | 1.0 |
| Nonfat dry milk solids | 2.0 |
| Sodium bicarbonate | 0.45 |
| Sodium acid pyrophosphate | 0.35 |
| Monocalcium phosphate | 0.30 |
| Mix together five minutes, sift, mix two minutes more, then add: | |
| Fluid shortening | 13.0 |

Using a wire whip mix one minute at a low speed, scrape down, then mix two minutes at a high speed.

A cake batter made from such mix is as follows:

| Ingredient | Grams |
| --- | --- |
| White cake mix | 567 |
| Water | 120 |
| Egg whites | 35 |

Mix two minutes at medium speed. Bake at 365° F. for approximately 23 minutes.

In the foregoing and similar pre-packaged mixes the water, egg, and fluid shortening can be added, if desired to the dry ingredients in a single stage instead of two stages.

Accordingly, in such instances it can be advantageous to make a packaged assembly of the mixed dry materials (flour, sugar, salt, milk powder, etc.) as one discrete unit and a flexibly-pouched or rigidly-bottled, measured quantity of our fluid shortening as another discrete unit. Maintenance of this fat separate from the dry ingredients imparts prolonged shelf-life to the assembly, and it provides a convenient way to make a cake simply and rapidly.

There has been provided, therefore, a continuous process for fluidizing oils to provide fluid shortenings. Any normally fluidizable oil may be treated in accordance with this process provided the conditions are suitably established for the apparatus. These will vary from apparatus to apparatus. Good correspondence in properties is obtained in this process with those which are obtained in batch fluidization of these materials. The result of the continuous fluidization process is that stable fluid products are obtained having high percentages of beta crystals. The process enables the production of these materials in a relatively short time compared with the times required for batch treatment.

What is claimed is:

1. A process for the continuous fluidization of a feed mixture comprising a major amount of a normally liquid base oil and a minor amount less than about 20% by weight of a normally solid lipid, said normally solid lipid exhibiting polymorphic crystalline behavior and having a beta crystal-forming tendency in said base oil, which process comprises: passing a flow of said feed mixture through a heat exchange zone that is maintained under substantially anaerobic conditions while submitting it to a sequence of at least two temperature oscillations that alternate between (a) a higher temperature which is above the melting temperature of alpha crystals in the solidifying lipid present but below the melting temperature of beta crystals in the solidifying lipid present and (b) a lower temperature which is below the melting temperature of alpha crystals in the solidifying lipid present but sufficiently high to maintain the fluency of the materials in process, continuing said temperature oscillations in said zone until a substantial proportion of said normally solid lipid is transformed into beta crystal form, and withdrawing the resulting composition from said heat exchange zone.

2. A process as defined in claim 1 wherein the feed mixture is nucleated before passing through the heat exchange zone.

3. A process as defined in claim 2 wherein the feed mixture is nucleated by shock cooling.

4. A process for the continuous fluidization of a composition including a major amount of a normally liquid base oil and a minor amount less than about 20% by weight of a normally solid lipid, said composition having an overall Iodine Value in the range of from about 75 to about 125 and exhibiting for said normally solid lipid polymorphic crystalline behavior, which process comprises flowing under substantially anaerobic conditions, a body of said composition through a continuous tube and submitting the composition to a sequence of at least two temperature oscillations while in said tube alternating between a high temperature which is above the melting point of the lower melting crystalline forms but below the melting point of the highest melting crystalline form, and a low temperature which is below the melting point of the lowest melting crystalline form, but no more than about 5° F. below, whereby a fluidizing portion of said normally solid lipid is transformed to the highest melting crystalline form and is suspended in said base oil and the resulting composition is stably fluid and pourable at ordinary temperatures.

5. A process as defined in claim 1 wherein no substantial part of said normally liquid base oil melts at a temperature above about 60° F. and no substantial part of said normally solid lipid has a melting point below about 100° F.

6. A process as defined in claim 1 wherein the normally solid lipid includes a normally solid triglyceride.

7. A process as defined in any of claims 1, 2, 3, 4, 5, or 6 wherein said normally liquid base oil and said normally solid lipid are edible.

8. A process as defined in any of claims 1, 2, 3, 4, 5, or 6 wherein the temperature oscillations have an amplitude of from about 8° F. to about 25° F.

9. A process as defined in any of claims 4, 5, or 6 wherein the normally solid lipid in the final product is converted to the highest melting crystalline form to the extent of at least about 80% of the total amount of normally solid lipid initially present.

10. A process as defined in any of claims 4, 5, or 6 wherein the highest melting crystalline form is the beta form.

11. A process as defined in claim 6 wherein the normally solid triglyceride in the final product is converted to the beta form to the extent of at least about 85% of the total amount of normally solid triglyceride initially present.

12. A process as defined in any of claims 1, 2, 3, 4, 5, or 6 wherein the minimum residence time under flow conditions is in the range of from 1 to about 25 minutes, and the flow rate is from 30 to about 50 pounds per hour.

13. A process as defined in any of claims 1, 2, 3, 4, 5 or 6, wherein the flow is plug flow substantially free of backmixing.

14. A process as defined in any of claims 1, 2, 3, 4, 5, or 6 wherein the temperature difference between the high temperature and the low temperature in successive cycles increases within the range of amplitudes of from about 8° F. to about 25° F.

15. A process as defined in any of claims 1, 2, 3, 4, 5, or 6 wherein the normally liquid base oil is partially hydrogenated soybean oil.

16. A process as defined in any of claims 1, 2, 3, 4, 5, or 6 wherein the normally liquid base oil is a partially hydrogenated vegetable oil.

17. A process as defined in any of claims 1, 2, 3, 4, 5, or 6 wherein the normally liquid base oil is a mixture of partially hydrogenated vegetable oils.

18. A process as defined in any of claims 1, 2, 3, 4, 5, or 6 wherein the normally liquid base oil also includes normally liquid mono- and diglycerides carried therein.

19. A process as defined in any of claims 1, 2, 3, 4, 5, or 6 wherein the high temperature is no more than 117° F. and the low temperature is no less than 65° F., the residence time under flow conditions is from 1 to 25 minutes, the number of temperature cycles is from 3 to 4, and the amplitude of the temperature oscillations is between about 8° F. and 25° F.

20. A process as defined in claim 3 wherein the composition is nucleated by votation.

21. A process as defined in any of claims 1, 2, 3, or 4 wherein the composition is nucleated by votation and the exit temperature from votation is in the range of from 65° F. to 100° F.

22. A process as defined in any of claims 1, 2, 3, 4, 5, or 6 wherein the fluid undergoing the temperature oscillations is mechanically worked.

* * * * *